Nov. 2, 1965         B. LEISI         3,215,796
ELECTRODYNAMIC DRIVE FOR SYNCHRONOUS CIRCUIT INTERRUPTERS
Filed Dec. 18, 1961                           3 Sheets-Sheet 1
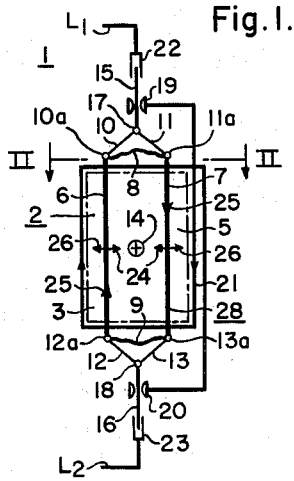
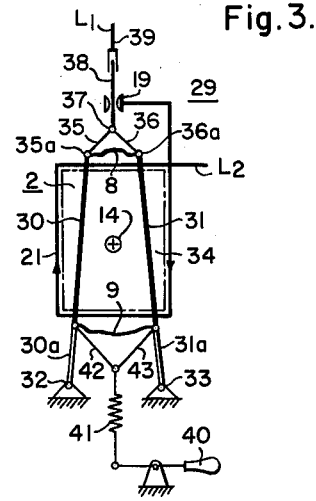
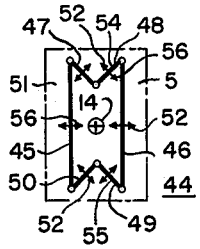
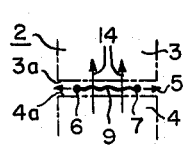
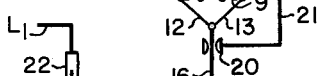
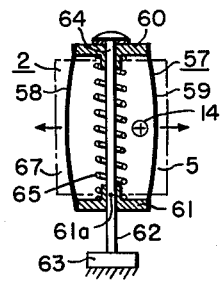
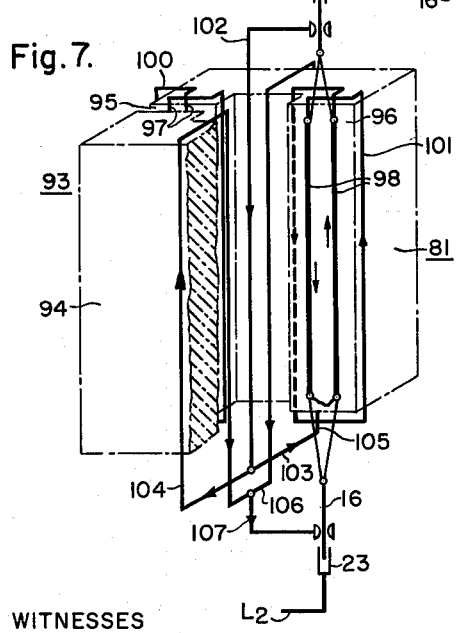
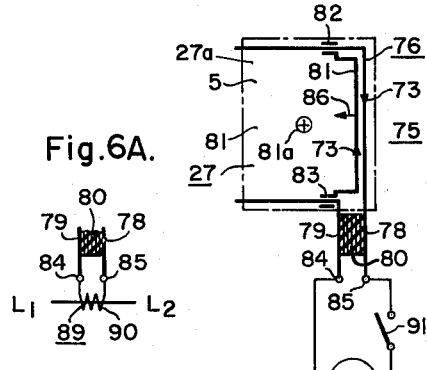
WITNESSES
Edwin E. Bassler
Leon M. Garman
INVENTOR
Bruno Leisi
BY
Willard R. Crout
ATTORNEY United States Patent Office 3,215,796
Patented Nov. 2, 1965

3,215,796
ELECTRODYNAMIC DRIVE FOR SYNCHRONOUS CIRCUIT INTERRUPTERS
Bruno Leisi, Zurich, Switzerland, assignor to Siemens-Schuckertwerke Aktiengesellschaft, Erlangen, Germany, a corporation of Germany
Filed Dec. 18, 1961, Ser. No. 160,077
Claims priority, application Germany, Dec. 19, 1960, S 71,720
7 Claims. (Cl. 200—91)

This invention relates to electrodynamic drives for synchronous circuit interrupters in general, and, more particularly, to an improved simplified electrodynamic drive for synchronous circuit interrupters for enabling the same to open the circuit near a current zero on the alternating-current wave.

A general object of the present invention is to provide an improved, highly-efficient, simplified and compact electrodynamic drive particularly suitable for application to synchronous switches to enable the same to positively interrupt the circuit close to a current zero on the alternating current wave.

Another object of the present invention is to provide an improved linkage which is responsive to the decrease in the magnetic field strength associated with a magnetic structure, which is energized in accordance with the current to be interrupted.

Still another object of the present invention is to provide an improved synchronous linkage for a synchronous-type circuit interrupter, which is of simplified construction and highly efficient in operation.

It has previously been proposed to use for the control and also for the direct operational drive of electric circuit interrupters electrodynamic systems of the kind employing a rotating or plunger-type moving coil. The coil is, in such arrangements, located in the air gap of a magnetic system, which is energized in accordance with the current to be interrupted, while the coil itself conducts a current, which is lagging behind the current to be interrupted.

Reference may be had to United States patent application filed August 29, 1961, Serial No. 134,655, by Fritz Kesselring and Ernst Gisiger, and assigned to the assignee of the instant application for a description of such types of apparatus.

In order to obtain large accelerations, the air gap must be small, and the movable coil must be made with the smallest possible movable mass.

Such a system has proven itself for synchronous releases and also for the direct operation of synchronous-type circuit interrupters.

The present invention also relates to electrodynamic drives; and, in accordance with features of the present invention, a system of current-carrying conductors is arranged in the air gap of a magnetic circuit, in which the conductor components within the air gap are movable with respect to each other, and whereby such component parts are moved by the effect of the forces due to the induction provided within the air gap. In this manner, it is possible to obtain high mechanical forces for the movable system by simple means, so that large driving or operating forces can be produced.

Preferably, the air gap is suitably determined by plane-parallel surfaces of the magnetic system. The system of moving conductors can be constructed and arranged so that the current flowing through it will be produced merely by the change of the flux encompassed by the moving conductor system. In addition, it is possible to introduce into the moving conductor system a current from a supplementary voltage source. As such a supplementary voltage source there may be used, for example, a winding connected in series with the conductor system, which winding is linked with the magnetic circuit.

Further objects and advantages will readily become apparent upon reading the following specification, taken in conjunction with the drawings, in which:

FIGURE 1 is a somewhat diagrammatic view of the principles employed in an application of the present invention to a two-break-type of synchronous circuit interrupter;

FIG. 1A illustrates a modification of the conductor system of FIG. 1;

FIG. 2 illustrates a diagrammatic plan view taken substantially along the line II—II of FIG. 1;

FIG. 3 illustrates an application of the invention to a single break type of synchronous circuit interrupter, the contact structure being shown in the closed-circuit position, and a non-synchronous operating device being employed in conjunction with the synchronous release;

FIG. 4 illustrates a modification of the invention utilizing a different movable conductor linkage;

FIG. 5 illustrates a further modification of the invention;

FIG. 6 illustrates a further modification of the invention utilizing an auxiliary voltage source for the moving conductor system;

FIG. 6A is a fragmentary view of a modified type of device, similar to that illustrated in FIG. 6, but utilizing a different voltage source;

FIG. 7 illustrates a further type of electrodynamic drive;

Figure 8:
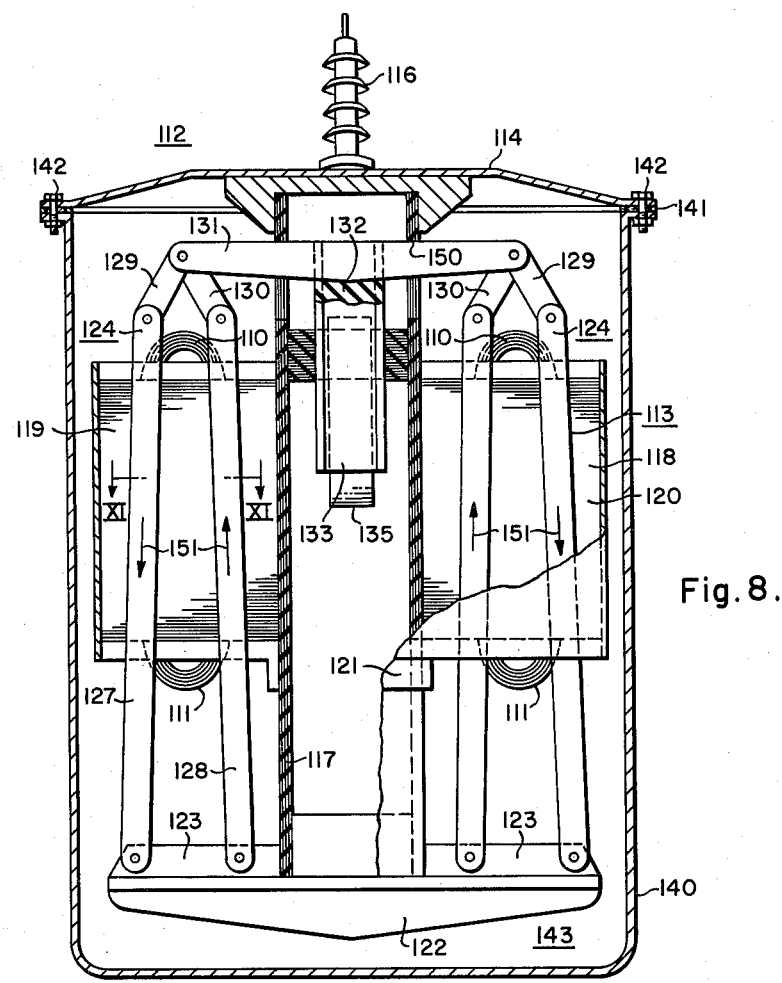
FIG. 8 illustrates a vertical sectional view taken through a modified type of interrupting device utilizing a synchronously-operated linkage, the view being taken substantially on the line VIII—VIII of FIG. 10, and the contact structure being illustrated in the closed-circuit position.

Referring to the drawings, and more particularly to FIG. 1 thereof, the reference numeral 1 generally designates a two-break synchronous-type circuit interrupter having associated therewith a magnet structure 2 comprising pole pieces 3, 4 (FIG. 2). An air gap 5 is provided between the opposed relatively plane surfaces 3a, 4a of the magnet system 2.

The reference numerals 6 and 7 designate movable rigid conductors, which are electrically interconnected with each other by flexible connectors 8, 9. As shown in FIG. 1, the movable rigid conductors 6, 7 are disposed within the air gap 5, whereas the flexible conductors 8, 9 are situated externally of the air gap 5 between the pole pieces 3, 4.

A plurality of insulating operating links 10–13 are pivotally connected, as at 10a, 11a, 12a and 13a, respectively, to the movable rigid conductors 6, 7 so as to transmit movement therefrom to a pair of movable rod-shaped contacts 15, 16. As shown, the insulating links 10, 11 are pivotally interconnected by a pivot pin 17, whereas the insulating links 12, 13 are pivotally interconnected by a pivot pin 18. There is preferably provided sliding contacts 19, 20, which are electrically interconnected by an energizing coil 21, which energizes the magnetic system 2 from the line current passing through the interrupter 1.

As shown in FIG. 1, the movable rod-shaped contacts 15, 16, respectively, cooperate with relatively stationary contacts 22, 23. The relatively stationary contacts 22, 23 are indicated as being connected to line conductors $L_1$, $L_2$.

In the closed-circuit position of the synchronous-type circuit interrupter 1, as shown in FIG. 1, the electrical circuit therethrough passes from the line connection $L_1$ to the relatively stationary contact 22, movable rod-shaped contact 15, resilient sliding finger contacts 19, energizing coil 21, to lower resilient sliding contacts 20, from whence the circuit passes through the lower movable rod-shaped contact 16 to the relatively stationary contact 23, and thence to the lower line conductor $L_2$.

It will be observed that when the magnetic system 2 transmits a decreasing magnetic flux as shown in the indicated direction 14, in such an eventuality the movable rigid conductors 6, 7 have currents induced therein, which are indicated by the corresponding arrows 25. Under the effect of the magnetic field provided in the air gap 5, the induced currents within the conductors 6, 7 cause motion thereof in an outward direction as indicated by the arrows 26. As a result, the insulating connecting links 10–13 move the upper and lower movable contacts 15, 16, respectively out of engagement with the relatively stationary contacts 22, 23 to the open-circuit position. When the magnetic flux reverses its direction, after the current has passed through its zero value, then the direction of the current induced in the rigid conductors 6, 7 remains for a time in the same direction, whereas the direction of the magnetic forces is reversed; and, consequently, the two rigid bars 6, 7 are moved inwardly, which results in closing of the circuit interrupter 1.

Such an electrodynamic drive, as indicated generally by the reference numeral 28, is particularly suitable for application in a synchronized-type switch for alternating-current networks, in which the energizing coil 21 carries the line current to be interrupted. Although at the rated current value, the forces exerted on the rigid conductor 6, 7 are very small so that the movable conductors 6, 7 remain practically at a standstill; nevertheless, upon the occurrence of an overcurrent, such as a fault current, the increase of the current, and consequently the flux within the magnetic system 2 will cause the movable rigid conductors 6, 7 to be moved inwardly. However, as soon as the magnetic flux decreases as toward a current zero, the foregoing rigid movable conductors 6, 7 are moved outwardly, as indicated by the arrows 26, which results in interruption of the current path at the movable contacts 15, 16. The dimensions of the linkage, the magnetic circuit, etc. are so selected that at the instant when the line current is passing through its zero value, the gap distance between the contacts 15, 22 and 16, 23 is, in known manner, at least equal to the breakdown distance.

If the circuit interrupter 1 does not clear the circuit at a current zero, and the current continues to flow, it will be noted that the current passing through the breaker 1 will increase during the subsequent half cycle, and the reaction of the induced currents within the rigid conductors 6, 7 upon the magnetic flux in the air gap will cause the rigid conductors 6, 7 to be moved inwardly, as indicated by the arrows 24, because at this time the magnetic flux has revresed its direction, but the lagging current in the conductors 6, 7 still maintains its direction. The circuit interrupter 1, therefore, following an unsuccessful opening operation, again closes automatically, and repeats the synchronized opening at the next passage of the current through its zero value. Also, when, for example, during a non-synchronous opening of small currents, the current suddenly increases due to a fault condition, the opening movement, which may already have begun, is nevertheless reversed; and the breaker will immediately reclose due to the inward forces 24 exerted upon the movable rigid conductors 6, 7.

FIG. 3 illustrates a modified type of synchronous single-break circuit interrupter, generally designated by the reference numeral 29. It will be noted that there are provided two rigid good current-carrying conductor bars 30, 31, which, at their lower ends, are rigidly interconnected with insulating levers 30a, 31a, respectively. The levers 30a, 31a are pivotally mounted in stationary bearings 32, 33. Again flexible connectors 8, 9 are provided to electrically interconnect the movable conductor bars 30, 31. The reference numeral 34 indicates the rear pole face of a magnet system 2. Insulating links 35, 36 are provided, being pivotally connected as at 35a, 36a to the conductor bars 30, 31, respectively. In addition, the insulating links 35, 36 are pivotally connected, as at 37, to a movable rod-shaped contact 38. The movable rod-shaped contact 38 makes separable contacting engagement with a relatively stationary contact 39. Again, sliding finger contacts 19 are provided together with an energizing circuit 21. It will be understood, however, that the energizing circuit 21, in series with the line current passing through the circuit interrupter 29, energizes the magnetic system 2 in a manner similar to that of FIG. 1 and the other line connection $L_2$ may be directly connected to the other end of the energizing winding 21.

The arrangement according to FIG. 3 operates in a similar manner to that of the interrupter 1 of FIG. 1, with the only essential difference being that the movable rigid conductors 30, 31 pivot at the bearing points 32, 33; and the interrupter 29 has only one interrupting gap, that is, between the relatively stationary and movable contacts 39, 38.

It is to be clearly understood that in the circuit interrupters 1, 29, described in FIGS. 1 and 3, that the breakers are represented only by the contact systems thereof. Associated with the contact systems 15, 22, 16, 23 and 38, 39 of the circuit interrupters shown may be employed any conventional type arc-extinguishing structures utilizing, for example, compressed air, insulating structures, or the like. It is also to be noted that in the circuit-breaker construction 29 of FIG. 3, non-synchronous opening may be effected by a hand lever 40, which is flexibly interconnected by a spring 41 to the insulating links 42, 43. In such manner, the movable contact 38 may be separated from the relatively stationary contact 39 by the non-synchronous manual means 40. As mentioned previously, the forces exerted upon the conductor bars 30, 31 are relatively small during the interruption of normal load currents.

The modified-type electrodynamic drive 44, illustrated in FIG. 4, includes a pair of rigid good current-carrying conductor bars 45, 46. As shown, the conductor bars 45, 46 are pivotally interconnected with additional good current-carrying pivoted bars 47, 48, 49, 50 all pivotally connected together, as shown. It will be noted that the additional bars 47–50 are located directly in the air gap 5 directly in front of the pole piece 51. A further kinematic explanation, similar to that presented in connection with FIGS. 1 and 3, is omitted here for the sake of simplicity.

It will be noted that when the flux within the air gap 5, encircled by the link system is decreasing, there are induced in the individual links 45–50 forces in the direction exerted shown by the arrows 52. Additionally, it may be seen that such forces 52 act not only upon the rigid bars 45, 46, but also upon the additional bars 47–50. The movable connections between the several bars contribute in this way to the development of forces. For certain applications, the produced toggle effect, exerted by the toggles 54, 55, takes place when the several bars are near their final positions, and this fact can be of the utmost importance. When the flux is increasing, also in this case the force action is changed, and the system then moves in the direction of the dotted line arrows 56.

Figure 5A:
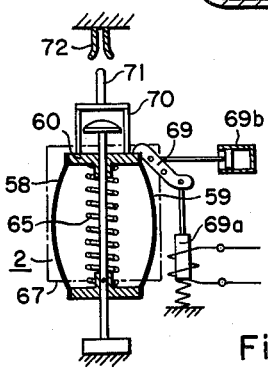
FIG. 5A illustrates a modified type of structure similar to that of FIG. 5.

The modified-type electrodynamic drive 57, illustrated in FIG. 5, includes flexible current-carrying conductors 58, 59. These flexible conductors are arranged in the air gap 5 of the magnetic system 2. They are electrically interconnected with rigid good current-conducting cross-bars 60, 61. It will be noted that one of the cross-bars 61 is pinned, as at 61a, to a stationary upstanding guide rod 62, the latter resting upon a fixed support 63. The upper cross-bar 60 is slidably mounted upon the stem 64 of the guide rod, being biased toward its upper position, as shown, by a compression spring 65. From the foregoing construction, the upper cross-bar 60 may freely slide back and forth upon the guide 64. The reference numeral 67 indicates the pole piece for the magnetic system 2. When the magnetic flux is decreasing, the flexible conductors 58, 59 are subjected to forces in an outward direction, whereby the upper conducting cross-bar 60 may be moved downwardly against the reaction of the compression spring 65. The upper conducting cross-bar 60 may be held in its final position by a latch 69, as indicated in FIG. 5A. When the latch 69 is released, as by energization of a solenoid 69a, the cross-bar 60 will return again to its upper position, as shown in FIG. 5, due to the effect of the compression spring 65.

In the arrangement according to FIG. 5, it will be noted that as soon as the upper conducting cross-bar 60 moves downwardly, it will enter the air gap 5 during such movement.

The entrance of the upper conducting cross-bar 60 into the air gap 5 on its downward movement causes the presence of a breaking force, which acts against the outward movement of the flexible conductors 58, 59. In this manner, breaking of the outward movement of the movable conductors 58, 59 takes place, which breaking action is very desirable under some circumstances. As shown in FIG. 5A, the upper cross-bar 60 may be connected, as by rods 70, to a movable contact pin 71, separable from a relatively stationary contact 72. As a result, downward movement of the cross-bar 60 effects contact separation between the separable contacts 71, 72, as indicated in FIG. 5A.

If the arrangement, as set forth in FIG. 5A, is used for an electrodynamic drive for a synchronous-type circuit interrupter, then the foregoing latch 69 is permitted to latch only with a time delay in such manner that the automatic reclosing, in case of an unsuccessful interruption, or at a current restrike, is not obstructed. It is preferable that the latch 69 holds the breaker in the open position only when the current interruption has been completed satisfactorily. To achieve this, the forces exerted by the spring 65 must be determined so that during the time delay of the latch 69, as effected by a one-way-acting dashpot 69b, only a small distance in the direction of closing travel is covered during the return travel.

In the modified type electrodynamic drive 75 illustrated in FIG. 6, there is shown an arrangement in which there is applied an additional outside voltage to the movable system 76. The reference numeral 77 indicates such an external source. The reference numeral 78 designates a relatively stationary good current-carrying conductor angle, which is connected with a smaller good current-carrying conductor angle 79 through a stationary insulating piece 80. The reference numeral 81 indicates a movable good current-carrying conductor, which may move laterally by a translating movement within the air gap 5 of the magnet 27. Preferably, sliding contacts 82, 83 are provided for this purpose. The indicated magnetic flux 81a in the air gap 5 is produced by an excitation winding 21, which is not shown, but may be similar to that illustrated in FIGS. 1 and 3. At the terminals 84, 85 of the conducting angles 79, 78, there is preferably connected the auxiliary current source 77. The current source 77 produces in the conducting angles 78, 79 and also in the movable conductor 81, a current in the direction as indicated by the arrows 73. With the assumed direction of the magnetic flux, the movable conductor 81 will, at decreasing flux values, be moved toward the left, as indicated by the arrow 86. The force, resulting from the induction in the air gap, will be further supplemented by the repulsing action between the conductors 78, 81 carrying currents in opposite directions. In the illustrated position, as shown in FIG. 6, the induced voltage is very small. This can be particularly valuable when the conductor 81 is used to drive, or synchronously operate, a synchronous-type circuit interrupter and when the current in the conductor loop at the rated current is kept as small as possible.

The current source 77 may be of any suitable type. In case of an operating system for synchronous-type circuit interrupter, the source 77 preferably has the same frequency as the line current to be interrupted, the latter producing the magnetic field in the pole piece 27a. In this case, as a current source may be used, for example, a current transformer, as illustrated in FIG. 6A. The primary winding of such a current transformer 89 may be energized from the line current, which is to be controlled or interrupted, whereas the secondary winding 90 may be connected to the terminals 84, 85. In this case, the current transformer 89 may serve for one or more air gaps, whereby the secondary current is lagging a little more than 90° behind the primary current. As the current source 77, there may also be used, for example, a winding which is linked to the magnetic circuit 81, as shown in FIG. 7, and hereafter described. Moreover, it is to be clearly understood that additional current sources 77 may be provided in the other examples of construction previously described in FIGS. 1, 3, 4 and 5.

It may be suitable to provide in the circuit of the conductors 78, 81 a switch, which may be closed at a predetermined overcurrent. Such a switch is designated by the reference numeral 91 of FIG. 6. A switch 91 may also be applied in the case of other examples of construction; for example, it may be provided in the conductor 9, as illustrated in FIG. 1A of the drawings.

In FIG. 7, there is illustrated a modified-type electrodynamic drive 93 in which the exciting winding of the magnetic circuit comprises more than one turn, constituting thereby an energizing coil, and in which, in addition, the conductors located in the air gap are connected one or more inductive coils, which are linked to the magnetic circuit. In this manner, still considerably larger forces and accelerations are thereby obtained. In particular, the reference numeral 94 designates a rectangular, laminated magnetic system, one part of which is not shown in FIG. 7 in order to make the structure more clear. The reference numerals 95, 96 designate the air gaps, while the reference numerals 97, 98 indicate movable conductor parts located in the air gaps. They are preferably electrically connected by flexible leads in series with supplementary coils 100, 101 arranged around the entire iron section. The primary lead is indicated by the reference numeral 102. It is, at its lower end, connected with a cross-bar 103, to which are connected also both coils 104, 105, which terminate at the cross-bar 106. The outgoing lead 107 is connected, as shown, to the lower cross-bar 106. It may be seen that the primary magnetic flux is produced primarily by the conductor 102 and, in addition, also by the coils 104 and 105. Further, it will be noted that the secondary induced voltage is produced, to a minor degree, in moving coils 97, 98 and in a larger degree in the supplementary coils 100, 101. Individual coils may not only have one turn, as shown, for the sake of simplicity, but also several turns may be provided. In the latter case, the flexible leads may be made considerably lighter, because the corresponding wire cross-section is small. The mechanical transmission of the forces acting upon the coils 97, 98 may be made in a similar manner to that shown, for example, in FIG. 1.

Figure 9:
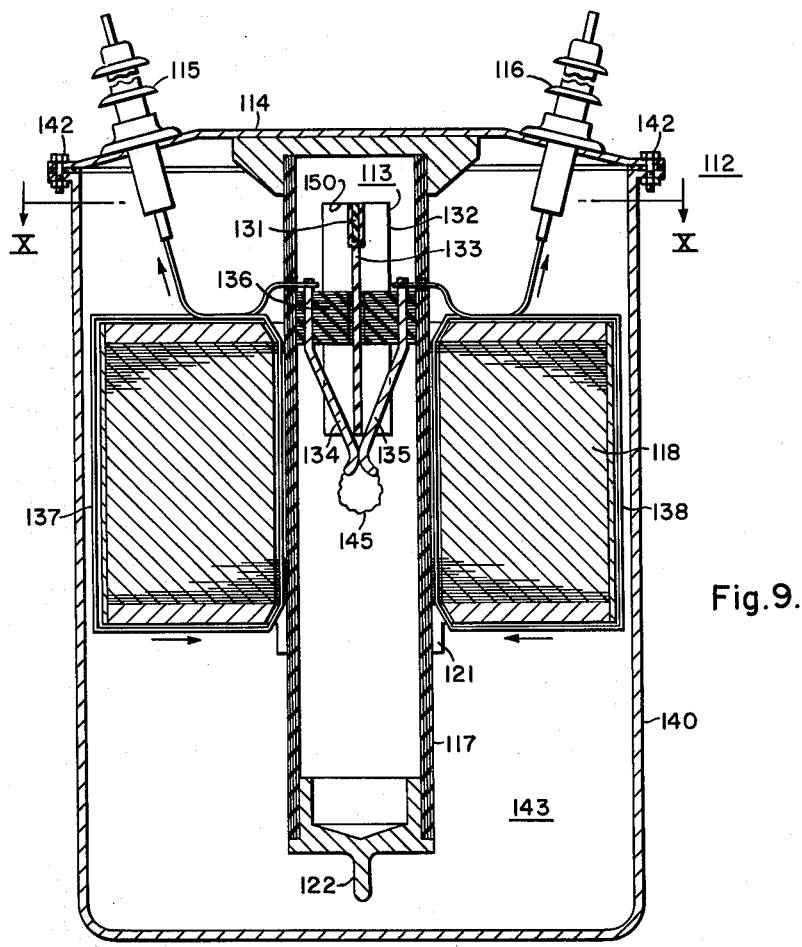
FIG. 9 illustrates a longitudinal vertical sectional view taken substantially along the line IX—IX of FIG. 10, again the contact structure being illustrated in the closed-circuit position.
Figure 10:
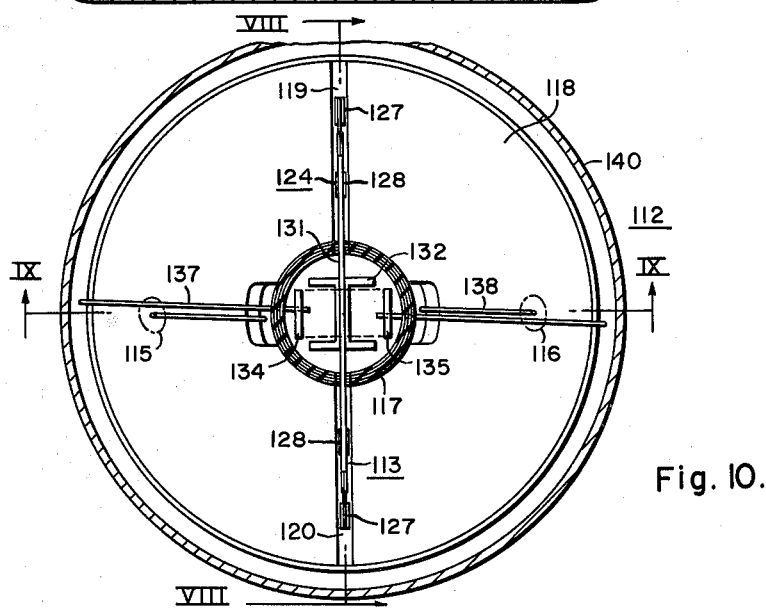
FIG. 10 is a plan view in section taken substantially along the line X—X of FIG. 9; and, FIG. 11 is a fragmentary sectional view taken substantially along the line XI—XI of FIG. 8.

FIGS. 8–10 illustrate a modified-type of synchronous circuit interrupter, generally designated by the reference numeral 112. Associated with the synchronous circuit interrupter 112 is a movable electrodynamic drive 113 operated in accordance with the principles of the present invention.

Figure 11:
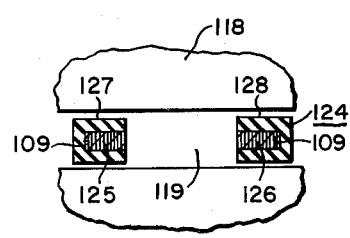

The reference numeral 114 designates a cover which clamps a pair of spaced terminal bushings 115, 116 fixedly into place. On the inner side of the cover 114 there is fixedly mounted an insulating tube 117. The reference numeral 118 illustrates a ring-shaped magnetic circuit having air gaps 119, 120. The magnetic circuit 118 is mounted by means of a flange 121 to the insulating tube 117. The reference numeral 122 indicates a cross-bar, which is also connected to the lower end of the insulating tube 117. Preferably, the cross-bar 122 is provided with outwardly extending support ribs 123 (FIG. 8). The two movable conductor systems 124 each comprises a spaced pair of flexibly wound conducting bands 125, 126. The conducting bands 125, 126 are pressed into recesses 109 provided in insulating operating rods 127, 128 having U-shaped cross-sections as shown in FIG. 11. The upper and lower parts 110, 111 of the conducting bands 125, 126 extending out of the air gaps 119, 120 are free and therefore maintain their flexibility. The ends of the conducting wound bands 125, 126 are preferably connected to each other in a good conducting manner, for example, as by soldering. The insulating operating rods 127, 128 are pivotally connected to the mentioned ribs 123. The operating rods 127, 128 are pivotally connected at the top to links 129, 130 to which is pivotally connected an insulating cross-bar 131. The insulating cross-bar 131 has connected to its other end, as viewed in FIG. 8, the corresponding operating links 129, 130 of the right-hand loop.

To the cross-bar 131 is fixedly attached a movable I-shaped insulating splitter strip 132, to which, in turn, there is attached a movable insulating separator strip 133, which, in the open position, is pushed between and separates spring-biased contacts 134, 135. The contacts 134, 135 are supported by an intermediate insulating support plate 136 inside of the insulating tube 117. The reference numerals 137, 138 indicate the energizing windings, which are placed around the iron core of the magnetic circuit 118, and the ends of which are connected to the terminal bushings 115, 116 and to the biased-together contacts 134, 135. Preferably, a pressure-proof housing tank 140 is bolted to the upper cover 114 with a sealing ring 141 by a plurality of bolts 142.

The inner space 143 within the tank 140 is preferably filled with a suitable highly-efficient arc-extinguishing medium, such, for example, as sulfur hexafluoride ($SF_6$) gas.

The synchronous-type circuit interrupter 112 of FIGS. 8-11 functions in the following manner: In the range of rated load currents, the current flows through the bushing 115, winding 137, contacts 134, 135, winding 138 to the bushing 116. The forces exerted upon the movable conductor loops 125, 126 are small. The system remains in the illustrated closed position. When, however, an overcurrent or a fault current occurs, the movable conductors 125, 126 do not move as long as the flux in the magnetic circuit 118 increases. They are at this time pushed inwards and therefore the insulating cross-bar 131 is pushed toward the upper edge of the slit 150 in the insulating tube 117. As soon as the magnetic flux begins to decrease, currents are induced in the movable conductors 125, 126 flowing in the direction of the illustrated arrows 151. This results in forces acting in an outward direction. The insulating cross-bar 131, together with the I-piece 132 are moved downwardly with considerable speed, which consequently results in separation of the spring-biased contacts 134, 135. An arc 145, having a loop configuration, strikes over the I-piece, which arc is, by electrodynamic forces, enlarged into a larger loop. In conjunction with the sulfur hexafluoride filling within the tank structure 140, there occurs a rapid extinction of the arc 145 when the current passes through its zero value. If interruption does not take place in the passage of the current through its zero value, then, of course, the current in the conductors 125, 126 retains its direction, but nevertheless the direction of the magnetic flux in the iron circuit 118 changes. This results in a condition whereby the conductors 125, 126 are pushed together with considerable force. As a result, the insulating cross-bar 131 together with the I-piece 132 move upwardly so that the contacts 134, 135 are again in contacting relation, and the arc 145 disappears. Shortly before the next passage of the current through zero, the opening process is repeated in the aforesaid manner.

Also in the case of an increase of the current before it passes through its zero value due to a restrike, the breaker 112 will reclose itself automatically, and at the next passage of the current through the zero value, the synchronized interruption will be carried out.

In the described examples of construction, the electrodynamic system according to the present invention has been used for the operation of the movable contact of a synchronous-type circuit interrupter. However, it is to be noted that the electrodynamic system can be used, in addition, as a synchronized trigger for the release of supply of energy for opening of synchronous breakers. Furthermore, the operating system is applicable for, for example, readjustment or setting of a resistance, which is switched into a circuit when an overcurrent occurs. In this case, the force pulling the conductors 6, 7 together is used so that when the current increases, a resistance is rapidly switched into the circuit whereby, when the final position is reached, the resistance can be latched in. The operating or driving system according to the present invention may be analogously used also for other control devices or also in the case of regulating devices.

From the foregoing description of several embodiments of the present invention, it is to be clearly understood that the same were merely for the purpose of illustration and that changes and modifications may readily be made therein by those skilled in the art, without departing from the spirit and scope of the invention.

I claim as my invention:

1. An electrodynamic drive for a synchronous-type alternating-current circuit interrupter including means defining a magnetic circuit having at least one air gap, alternating current coil means utilizing at least a portion of the line current passing through the circuit interrupter for generating a varying magnetic field across said air gap, a movable short-circuited conductor system encompassing at least a portion of the varying magnetic flux crossing said air gap so as to have a current induced therein, the inductive effect causing a lag in the induced current in said short-circuited conductor system following a reversal of the magnetic flux across said air gap, whereby upon an unsuccessful interruption at a current zero the movable short-circuited conductor system will bias the circuit interrupter again to the closed circuit position.

2. The electrodynamic drive according to claim 1, wherein a portion of the movable current-carrying conductor system is rigid and is disposed within the air gap and another portion of said system is flexible and is disposed externally of the air gap.

3. The combination in a synchronous-type alternating current circuit interrupter of contact means separable to establish an arc, mechanical linkage means for effecting opening of said contact means, means defining a magnetic circuit having an air gap, a movable current-carrying linkage means disposed at least partially within the air gap and including substantially rigid conductor bars within the air gap and flexible conductors externally of the air gap, connecting means mechanically interconnecting the two linkage means, coil means encircling the magnetic circuit utilizing at least a portion of the line current passing through the synchronous-type circuit interrupter to energize the magnetic circuit, whereby the current induced in the movable linkage system moves the component parts thereof near a current zero to effect contact separation close to a current zero on the alternating current wave.

4. A synchronous alternating current circuit interrupter including a diametrically-split magnetic circuit, line current means including a pair of biased-together movable contacts for energizing said magnetic circuit, a movable yoke member having a splitter device for moving between the biased-together movable contacts for causing the separation thereof and arc establishment, a stationary yoke member having two pairs of pivotally mounted operating links extending within the two air gaps, an independent movable closed-turn conductor system mechanically secured to the sides of each of said pairs of operating links for causing the actuation thereof, linkage means interconnecting said movable yoke with the said pairs of operating links, whereby the current induced within the two closed-turn conductor systems during decreasing flux conditions in the magnetic circuit interacts with the flux in the two air gaps to effect opening movement of said movable yoke and consequent separation of the biased-together movable contacts.

5. The synchronous-type circuit interrupter according to claim 4, wherein tank means with a pair of spaced terminal bushings are provided, and a depending insulating tube from a cover means encloses the established arc.

6. The combination of claim 5, wherein a highly-efficient gas comprising sulfur hexafluoride ($SF_6$) is provided within the tank means.

7. The combination in a tank-type synchronous alternating current circuit interrupter including a cover supporting a pair of terminal bushings and a downwardly depending insulating tube, a split ring-shaped magnetic circuit, line current means including a pair of biased-together movable contacts for energizing said magnetic circuit, a movable yoke member having a splitter device for moving between the biased-together movable contacts for causing the separation thereof and arc establishment, a stationary yoke member having two pairs of pivotally mounted operating links extending within the two air gaps, an independent movable closed-turn conductor system mechanically secured to the sides of each of said pairs of operating links for causing the actuation thereof, linkage means interconnecting said movable yoke with the said pairs of operating links, whereby the current induced within the two closed-turn conductor systems during decreasing flux conditions in the magnetic circuit interacts with the flux in the two air gaps to effect opening movement of said movable yoke and consequent separation of the biased-together movable contacts.

References Cited by the Examiner
UNITED STATES PATENTS

| | | | |
|---|---|---|---|
| 911,549 | 2/09 | Townsend | 200—91 |
| 1,805,497 | 5/31 | Paul | 200—87 X |
| 1,889,479 | 11/32 | Keller | 200—98 |
| 2,053,619 | 9/36 | Le Goff | 200—91 X |
| 3,005,073 | 10/61 | Reiss et al. | |
| 3,068,379 | 12/62 | Cole | 200—87 X |
| 3,071,669 | 1/63 | Leeds et al. | 200—87 |

BERNARD A. GILHEANY, *Primary Examiner.*

ROBERT K. SCHAEFER, *Examiner.*